United States Patent
Song et al.

(10) Patent No.: US 10,906,428 B2
(45) Date of Patent: Feb. 2, 2021

(54) POWER SUPPLY SYSTEM WITH HYDROGEN FUEL CELL

(71) Applicant: NATIONAL CHIAO TUNG UNIVERSITY, Hsinchu (TW)

(72) Inventors: Kai-Tai Song, New Taipei (TW); Sz-Sheng Wang, Hsinchu (TW); Shao-Huan Song, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 260 days.

(21) Appl. No.: 16/108,781

(22) Filed: Aug. 22, 2018

(65) Prior Publication Data
US 2019/0322180 A1 Oct. 24, 2019

(30) Foreign Application Priority Data
Apr. 23, 2018 (TW) .............................. 107113646 A

(51) Int. Cl.
*H02J 7/00* (2006.01)
*B60L 58/40* (2019.01)
(Continued)

(52) U.S. Cl.
CPC ............... *B60L 58/40* (2019.02); *B60L 50/90* (2019.02); *B60L 58/21* (2019.02); *B60L 58/31* (2019.02)

(58) Field of Classification Search
USPC ......................................................... 320/140
See application file for complete search history.

(56) References Cited

U.S. PATENT DOCUMENTS

| 4,931,947 A | * | 6/1990 | Werth | H01M 16/006 |
| | | | | 700/297 |
| 6,369,461 B1 | * | 4/2002 | Jungreis | H01M 16/003 |
| | | | | 307/23 |

(Continued)

FOREIGN PATENT DOCUMENTS

| TW | 200841502 A | 10/2008 |
| TW | I528682 B | 4/2016 |

(Continued)

OTHER PUBLICATIONS

Wei Wu, Richard W.G. Bucknall; Downsizing Fuel Cell Capacity in a Hybrid Hydrogen Vehicle by Regenerative Energy Capture with Super Capacitor; IEEE 978-1-4799-6557-I/14; 2014.

(Continued)

*Primary Examiner* — Samuel Berhanu
(74) *Attorney, Agent, or Firm* — Rosenberg, Klein & Lee

(57) ABSTRACT

A power supply system with hydrogen fuel cell is provided, comprising a hydrogen fuel cell module converting hydrogen fuel into electrical power for outputting. A boost charging module electrically connected to the hydrogen fuel cell module receives, boosts and converts the electric power into charging power. At least two battery packs connected in parallel are electrically connected to the boost charging module and an external load respectively. When one of the battery packs discharges the external load, the other selectively receives charging power from the boost charging module. A control module electrically connected to the above controls the boost charging module to receive electrical power and convert it into charging power and controls the battery packs to alternate performing discharging the external load and charging from the boost charging module repeatedly by turns. The present invention combines hydrogen fuel cells to provide an innovative power supply system.

14 Claims, 6 Drawing Sheets

(51) Int. Cl.
B60L 50/90 (2019.01)
B60L 58/21 (2019.01)
B60L 58/31 (2019.01)

(56) References Cited

U.S. PATENT DOCUMENTS

| | | | |
|---|---|---|---|
| 9,770,996 B2 | 9/2017 | Chen et al. | |
| 9,770,998 B2 | 9/2017 | Kim | |
| 2006/0001398 A1* | 1/2006 | Nguyen | H01M 16/006 320/101 |
| 2008/0007227 A1* | 1/2008 | Noda | H02J 7/0068 320/160 |
| 2012/0091731 A1* | 4/2012 | Nelson | H02J 7/0024 290/1 R |
| 2016/0006060 A1* | 1/2016 | Kwon | H01M 8/04559 429/442 |
| 2017/0166081 A1* | 6/2017 | Kwon | H01M 10/44 |
| 2017/0240050 A1* | 8/2017 | Oya | H01M 8/04302 |
| 2017/0317512 A1* | 11/2017 | Sung | H02J 7/0068 |
| 2019/0322180 A1* | 10/2019 | Song | B60L 58/31 |

FOREIGN PATENT DOCUMENTS

| | | |
|---|---|---|
| TW | I586076 B | 6/2017 |
| TW | 201742349 A | 12/2017 |

OTHER PUBLICATIONS

Roy Chaoming Hsu, Shi-Mao Chen, Wen-Yen Chen, Cheng-Ting Liu; A Reinforcement Learning Based Dynamic Power Management for Fuel Cell Hybrid Electric Vehicle; 2016 Joint 8th International Conference on Soft Computing and Intelligent Systems and 2016 17th International Symposium on Advanced Intelligent Systems; 978-1-5090-2678-4/16; 2016 IEEE, pp. 460-464.

Youlong Wang, Li Hongyang, Wen Xuhui; System Design and Energy Management for Li-ion Battery, Seawater Battery and Fuel Cell Hybrid Energy Storage System; 2017 IEEE Transportation Electrification Conference and Expo, Asia-Pacific (ITEC Asia-Pacific), 978-1-5386-2894-2/17, 2017 IEEE.

* cited by examiner

POWER SUPPLY SYSTEM WITH HYDROGEN FUEL CELL

This application claims priority for Taiwan patent application no. 107113646 filed on Apr. 23, 2018, the content of which is incorporated by reference in its entirety.

BACKGROUND OF THE INVENTION

Field of the Invention

The present invention relates to a power supply system, and more particularly to a power supply system with hydrogen fuel cell which comprises a variety of battery packs.

Description of the Prior Art

As a social structure nowadays is gradually ageing, service robots will become more and more popular and be the main streams of medical care and auxiliary equipments. However, a main concern thereof is the power source of these robots. Regarding power supplied to the robots, a variety of charging methods or batteries have been provided, for example building a charging station for the robots to automatically perform charging back and forth. Nevertheless, a stable and sufficient power source is always necessary no matter what types of robots they are and a more profitable and ideal design will be carried out only if the robot itself can provide its own power supply.

As far as we know, power resources nowadays are indispensable, whereby all human generations have been relying on. They can be utilized everywhere and can be classified as renewable energy or non-renewable energy. For instance, coal, petroleum, natural gas, nuclear energy, and so on are classified into non-renewable energy, while solar energy, hydraulic energy, wing energy, geothermal energy, tidal energy, ocean-current energy, biomass energy and so on are classified into renewable energy, in which one of the green energy resources draws greatest attention is hydrogen fuel cell.

The hydrogen fuel cell is a stable and efficient resource among all the green energy, which employs oxygen or other oxidants to perform reduction-oxidation reactions so as to convert the chemical energy within the fuel into electrical power for outputting, such that a continuous and stable power supply can be generated and provided until the hydrogen fuel has run out. However, it is known that the hydrogen fuel cell can not generate a great amount of power for outputting in a split second due to its chemical reactions. Therefore, an alternative which is able to compensate the shortcomings, such as lithium polymer battery (Li—Po) is adopted. Although Li—Po is able to generate a great amount of power in a split second, nevertheless charging still being a must for it, inconvenience for using the Li—Po is still a problem.

Therefore, on account of above, inventors of the present invention propose to combine both to generate an ideal power supply system, which comprises advantages of the hydrogen fuel cell in which its fuel can be rapidly refilled as well as features of the Li—Po in which a great amount of current can be generated in a split second. The proposed power supply system is able to function independently without being connected to any external power, not only solving the power supply problems of robots, but also making the robots much more applicable.

SUMMARY OF THE INVENTION

In order to overcome the abovementioned disadvantages, one major objective in accordance with the present invention is to provide a power supply system with hydrogen fuel cell, which is much more practical than a conventional charging system and the electrical power needed can be continuously supplied. Under circumstances of all applying conditions, for example when one of the battery packs discharges to an external load while the other is charged from the hydrogen fuel cell, the power supply can be provided stably by controlling the battery packs to alternate performing charging and discharging repeatedly by turns.

Another objective in accordance with the present invention is to provide a power supply system with hydrogen fuel cell, which uses hydrogen fuel as source of the power, and will not take too much of the energy storage space. Also, the power supply system is able to charge its external load, such as a robot for long term, and the power supply will be stable such that the robot is able to function normally and continuously.

For achieving the abovementioned objectives, the present invention provides a power supply system with hydrogen fuel cell, comprising a hydrogen fuel cell module, a boost charging module, at least two battery packs in parallel and a control module. The hydrogen fuel cell module is able to convert hydrogen fuel into electrical power for outputting. The boost charging module is electrically connected to the hydrogen fuel cell module for receiving the electrical power output from the hydrogen fuel cell module, and boosting the electrical power to convert into charging power for outputting. Each of the battery packs is electrically connected to the boost charging module and an external load. When one of the battery packs is discharging to the external load, the other of the battery packs is selectively receiving the charging power from the boost charging module. The control module is electrically connected to the hydrogen fuel cell module, the boost charging module and the at least two battery packs, wherein the control module controls the boost charging module to receive the electrical power output from the hydrogen fuel cell module and to boost and convert it into the charging power, and the control module controls the at least two battery packs to alternate performing discharging the external load and charging form the boost charging module repeatedly by turns.

According to one embodiment of the present invention, the boost charging module further comprises at least two boost charging devices, being electrically connected to the hydrogen fuel cell module and the battery packs.

According to one embodiment of the present invention, the boost charging module further comprises a booster being electrically connected to the hydrogen fuel cell module and receiving the electrical power for boosting; and a charger being electrically connected to the booster and the battery packs to receive and convert the boosted electrical power into the charging power for transmitting to the battery packs.

According to one embodiment of the present invention, the boost charging module further comprises a charging switch controller being electrically connected to the booster, the charger and the control module. The control module determines whether or not the charging switch controller should be turned on or off so as to selectively transmit the boosted electrical power from the booster to the charger for further converting process.

According to one embodiment of the present invention, the boost charging module further comprises a first detection circuit, being electrically connected to the charging switch controller, the control module and the charger. The first detection circuit is able to detect a value of the boosted electrical power which is transmitted to the charger from the charging switch controller and to detect a value of the charging power converted from the charger such that the control module determines whether or not the charging switch controller should be turned on or off based on the first detection circuit.

Also, the present invention further comprises at least two discharging switch controllers, wherein each of the discharging switch controllers is electrically connected to one of the battery packs, the external load and the control module. The control module is able to turn each of the discharging switch controllers on or off so as to control the battery packs to discharge the external load selectively.

The present invention further comprises at least two driving switch controllers, being electrically connected to the at least two discharging switch controllers and the control module, wherein turn-on voltages and turn-on currents of the at least two driving switch controllers are smaller than those of the at least two discharging switch controllers, and the at least two driving switch controllers can be controlled by the control module so as to drive an on or off state of the at least two discharging switch controllers.

According to one embodiment of the present invention, the hydrogen fuel cell module further comprises a hydrogen storing circuit; a hydrogen fuel cell for receiving the hydrogen fuel stored in the hydrogen storing circuit and converting the hydrogen fuel into the electrical power for outputting; a detecting element, being disposed between the hydrogen storing circuit and the hydrogen fuel cell and electrically connected to the control module, wherein the detecting element detects a concentration of the hydrogen fuel in the hydrogen fuel cell and transmits the detected concentration to the control module; and a expelling element, being disposed inside the hydrogen fuel cell and electrically connected to the control module. As such, when the concentration of the hydrogen fuel cell decreases, the control module controls the expelling element to remove impurities inside the hydrogen fuel cell so as to increase the concentration of the hydrogen fuel in the hydrogen fuel cell.

According to one embodiment of the present invention, a second detection circuit is further disposed between the battery packs and the external load. The second detection circuit is electrically connected to the battery packs, the external load and the control module such that the control module controls the battery packs to alternate performing charging or discharging process repeatedly by turns by employing the second detection circuit to detect a value of discharging power which any one of the battery packs discharges the external load.

In one embodiment of the present invention, the external load is a mobile robot or an electrical vehicle.

In one embodiment of the present invention, each of the battery packs is a lithium polymer battery (Li—Po).

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
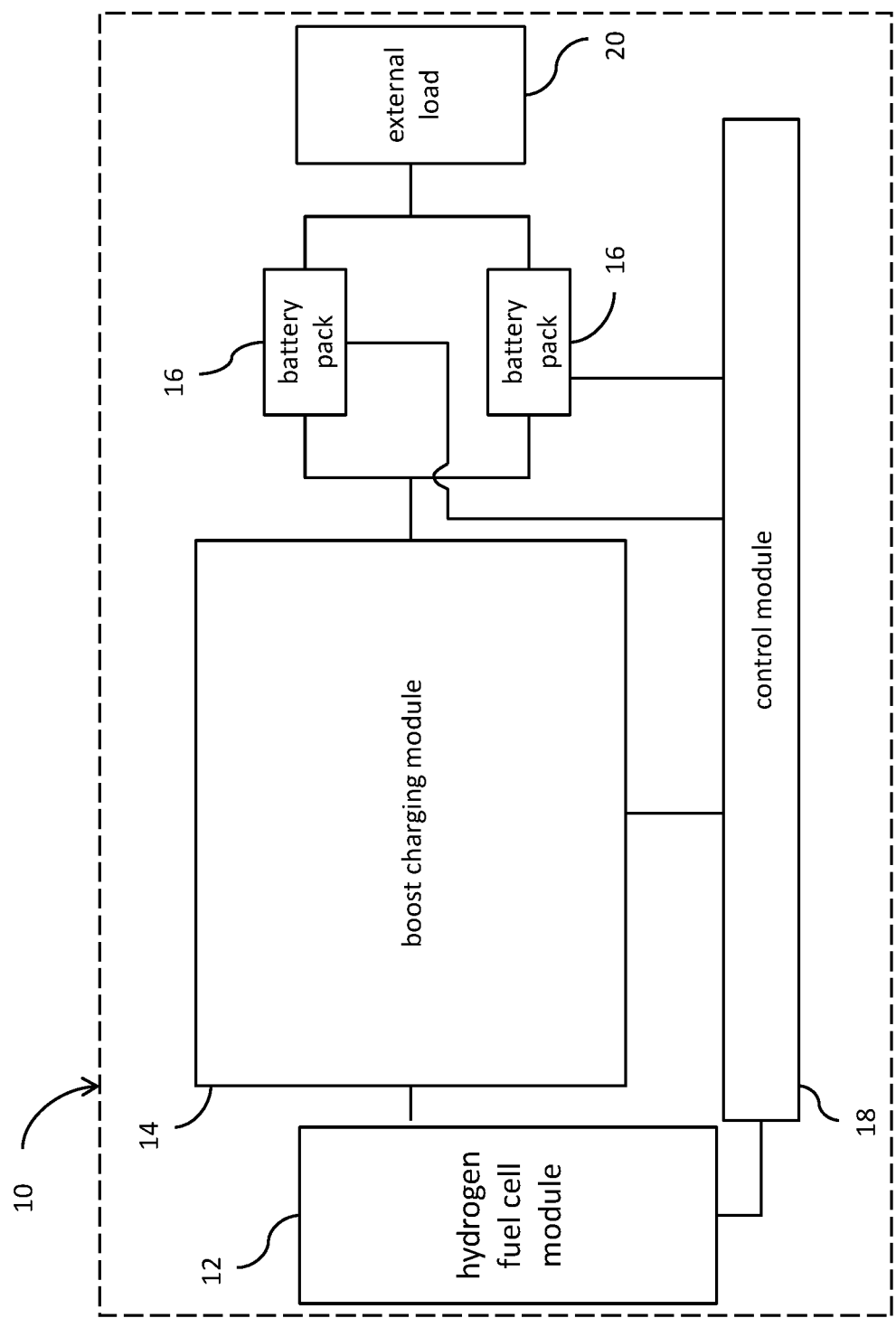
FIG. 1 shows a block diagram in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it should be noticed that, it is not intended to limit the scope of the present invention. Therefore, any equivalent modification or variation according to the spirit of the present invention is to be also included within the scope of the present invention.

The present invention provides a novel power supply system adapted for robots based on matching characteristics of a hydrogen fuel cell and lithium polymer battery. In general, the hydrogen fuel cell is advantageous of refueling rapidly and outputting stable power, while the lithium polymer battery is advantageous of charging rapidly and generating larger currents. To combine their individual merits, an inventive power supply system is thus established. Moreover, simply circuit logics can be further employed to manage the charging and discharging behavior of the lithium polymer battery. An external communication control is also able to be adopted so as to make the robot switch its power supply battery according to various demands.

At first, please refer to FIG. 1. The power supply system 10 with hydrogen fuel cell comprises a hydrogen fuel cell module 12, a boost charging module 14, at least two battery packs 16 and a control module 18. The hydrogen fuel cell module 12 is electrically connected to the boost charging module 14, the at least two battery packs 16 are connected in parallel and each of the battery packs 16 is electrically connected to the boost charging module 14 and an external load 20. The control module 18 is electrically connected to the hydrogen fuel cell module 12, the boost charging module 14 and the at least two battery packs 16. According to one embodiment of the present invention, the control module 18, for example, is an Arduino I/O interface control module, the battery pack 16 can be a lithium polymer battery (Li—Po), and the present invention employs the power supply system with hydrogen fuel cell comprising two battery packs 16 as a demonstrating embodiment. Nevertheless, the present invention is not limited thereto. Also, the external load 20, for example, can be a mobile robot or an electrical vehicle. The power supply system 10 of the present invention can be disposed on the external load 20 and being electrically connected to the external load 20. However, the power supply system 10 of the present invention is not limited to be disposed on a specific spot of the external load 20.

Figure 2:
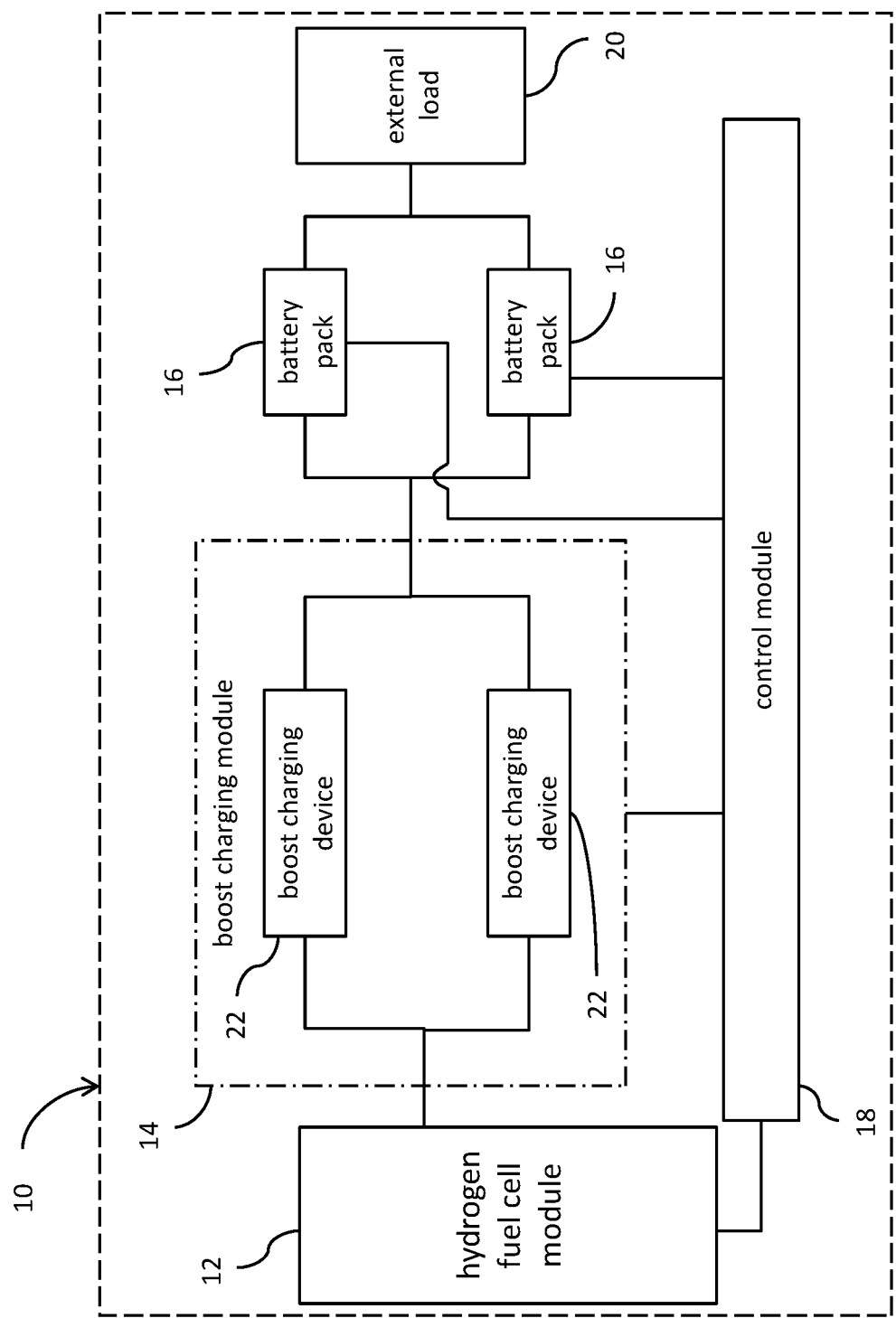
FIG. 2 shows a block diagram in accordance with one embodiment showing a number of the boost charging devices of the present invention.

Meanwhile, please refer to FIG. 2 as well. The boost charging module 14 further comprises at least two boost charging devices 22, and each of the boost charging devices 22 is electrically connected to the hydrogen fuel cell module 12 and a battery pack 16. According to the embodiment of the present invention, the numbers of the boost charging devices 22 are exactly the same as those of the battery packs 16, in which the present invention employs the boost charging module 14 comprising two boost charging devices 22 as a demonstrating embodiment. In general, each of the boost charging devices 22 is electrically connected between its corresponding battery pack 16 and the hydrogen fuel cell module 12.

Figure 3:
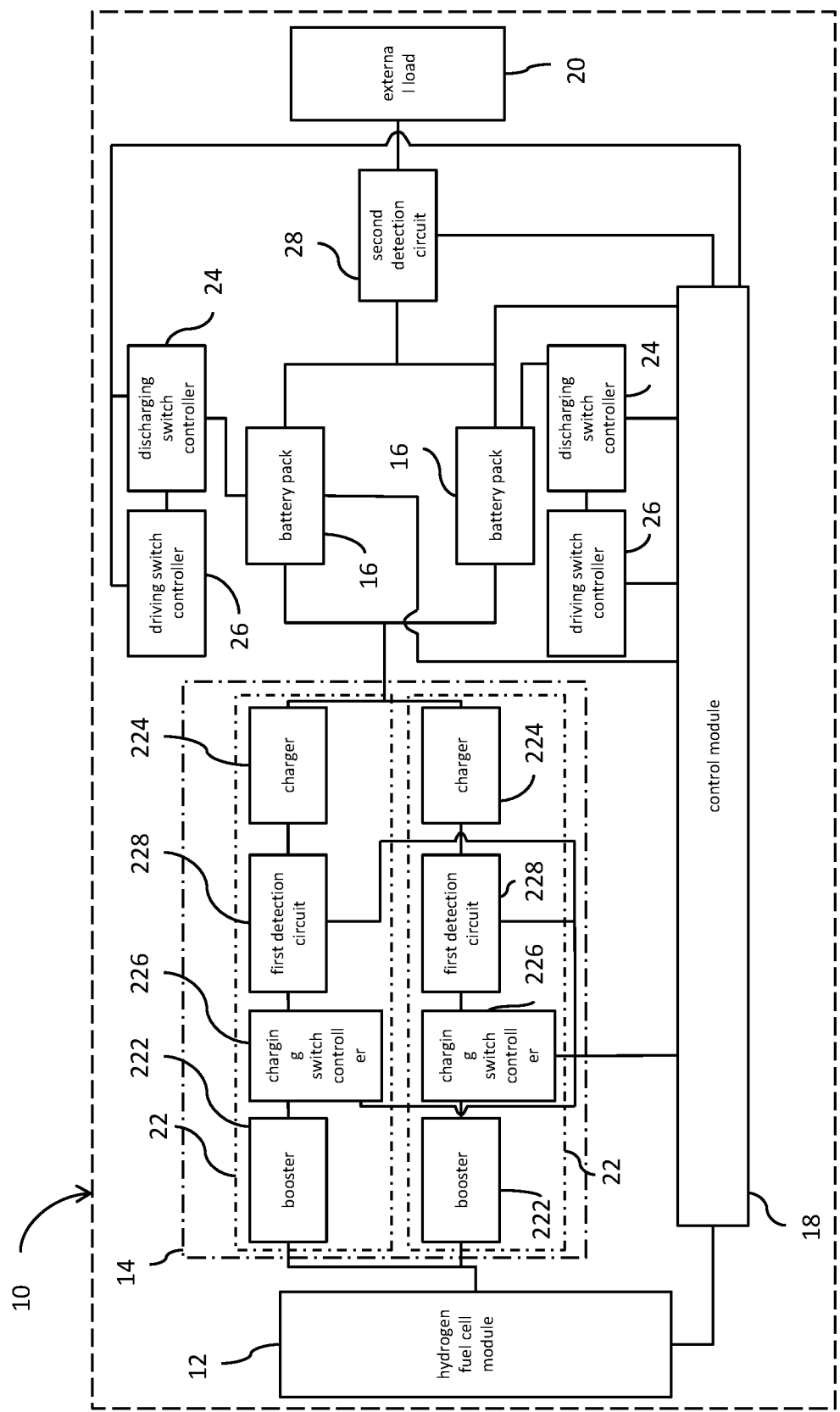
FIG. 3 shows a block diagram in accordance with one embodiment of a detailed structure of the present invention.

For more details, please refer to FIG. 3, which shows each of the boost charging devices 22 further comprises a booster 222, a charger 224, a charging switch controller 226, and a first detection circuit 228. The booster 222 is electrically connected to the hydrogen fuel cell module 12, and the charger 224 is electrically connected to the booster 222 and the battery pack 16. The charging switch controller 226 is electrically connected to the booster 222, the charger 224 and the control module 18. The first detection circuit 228 is electrically connected to the charging switch controller 226, the control module 18 and the charger 224. In addition, a second detection circuit 28 is further disposed between the two battery packs 16 and the external load 20. The second detection circuit 28 is electrically connected to the two battery packs 16, the external load 20 and the control module 18. According to one embodiment of the present invention, the first detection circuit 228 and the second detection circuit 28, for example, can be Hall current sensors.

Moreover, the power supply system 10 of the present invention further comprises at least two discharging switch controllers 24 as well as at least two driving switch controllers 26, in which each of the discharging switch controllers 24 is electrically connected to a battery pack 16, the external load 20 and the control module 18, and each of the driving switch controllers 26 is electrically connected to a discharging switch controller 24 and the control module 18. According to the embodiment of the present invention, the numbers of the discharging switch controllers 24 as well as the driving switch controllers 26 are exactly the same as those of the battery packs 16. As such the present invention employs comprising two discharging switch controllers 24 and two driving switch controllers 26 as a demonstrating embodiment. In an exemplary embodiment, each of the discharging switch controllers 24 as well as the driving switch controllers 26 and the charging switch controller 226 can be a relay.

Figure 4:
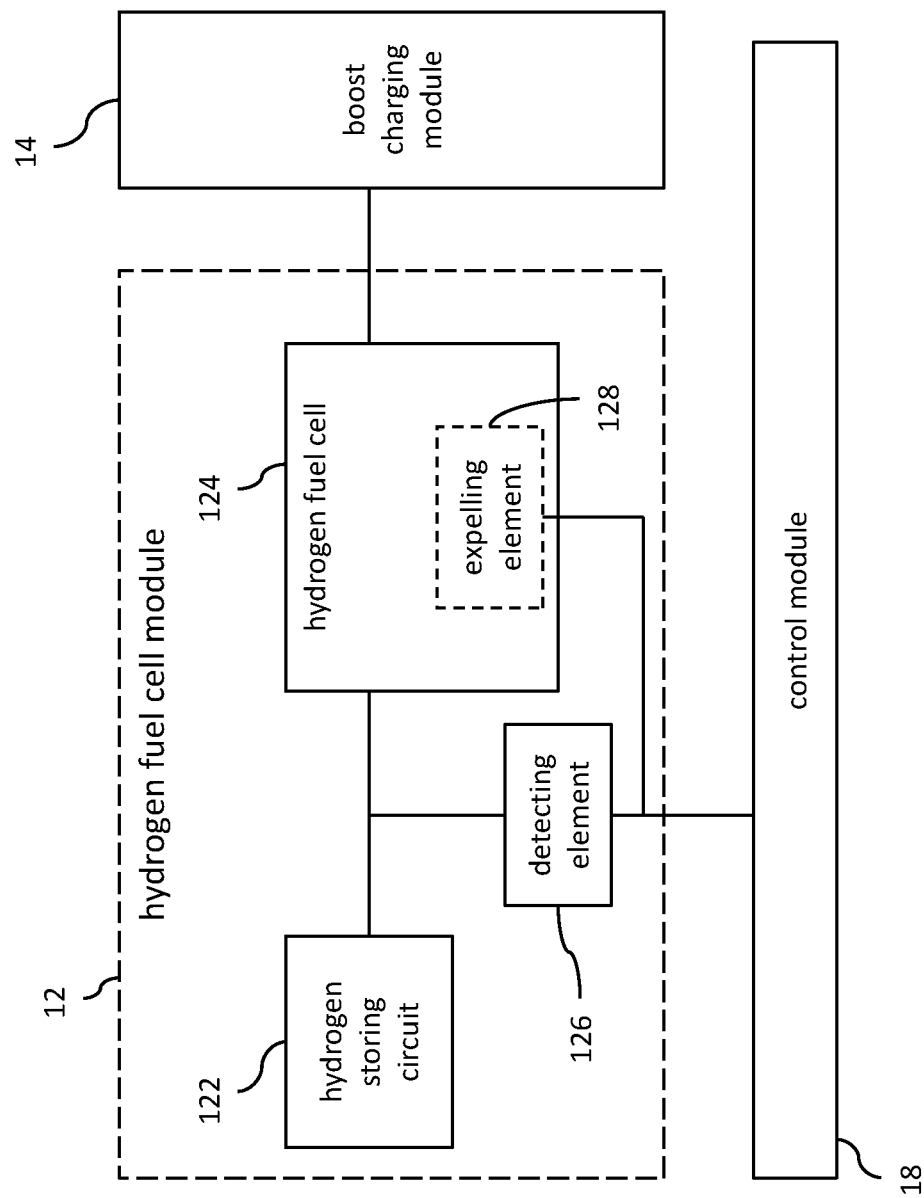
FIG. 4 shows a block diagram in accordance with one embodiment of the hydrogen fuel cell module of the present invention.

Please refer to FIG. 4 with respect to FIG. 1, which shows the hydrogen fuel cell module 12 of the present invention further comprises a hydrogen storing circuit 122, a hydrogen fuel cell 124, a detecting element 126 and an expelling element 128. The hydrogen fuel cell 124 is electrically connected to the hydrogen storing circuit 122 and the boost charging module 14. The detecting element 126 is electrically connected between the hydrogen storing circuit 122 and the hydrogen fuel cell 124 and electrically connected to the control module 18. The expelling element 128 is disposed inside the hydrogen fuel cell 124 and being electrically connected to the control module 18. According to the embodiment of the present invention, the expelling element 128 for example can be an electromagnetic valve.

Since the above descriptions have fully explained the structure of the present invention, how the present invention is provided with charging and discharging will be discussed in the following. At first, please refer to FIG. 1 and FIG. 4 for explaining details of the hydrogen fuel cell module of the present invention. As shown, the hydrogen storing circuit 122 can be used for storing hydrogen fuel and transmitting the hydrogen fuel to the hydrogen fuel cell 124. In practice, a manual valve (not shown) and a pressure regulation valve (not shown) can be further disposed between the hydrogen storing circuit 122 and the hydrogen fuel cell 124 for preventing the hydrogen fuel (i.e. the high pressure hydrogen) inside the hydrogen storing circuit 122 from directly steaming into the hydrogen fuel cell 124. A user can preset a pressure value for supplying the hydrogen fuel, for instance between 6~7 Psi, and 5 Psi for the hydrogen fuel cell 124. In this case, when it runs out of the hydrogen fuel, the hydrogen fuel cell 124 is able to complement the pressure through the pressure regulation valve so as to form an automatic hydrogen supplying path such that the hydrogen fuel cell 124 can continuously convert the hydrogen fuel into electrical power for outputting to the boost charging module 14. However, during the converting process, some impurities (i.e. water) may be generated due to the chemical reactions and therefore affect the hydrogen concentration of the hydrogen fuel cell 124. To solve the issues, the detecting element 126 is used to detect the hydrogen concentration of the hydrogen fuel cell 124 and transmit it to the control module 18. When the control module 18 learns that the hydrogen concentration of the hydrogen fuel cell 124 is lower than a certain proportion, for example downed to 99%, the control module 18 controls the expelling element 128 for removing those impurities inside the hydrogen fuel cell 124. Since a one-time and long-term expelling process may affect the hydrogen pressure as well as the voltage value of the hydrogen fuel cell 124, the expelling element 128 of the present invention can promptly take turns for dispelling the impurities out. By such arrangements, the hydrogen fuel cell 124 of the present invention can successively convert the hydrogen fuel into electrical power for outputting to the boost charging module 14 in a much more stable manner.

Now please refer to FIG. 1 to FIG. 4, in which the boost charging module 14 of the present invention comprises two boost charging devices 22 as shown. Being controlled by the control module 18, these two boost charging devices 22 will be taking turns to charge its correspondingly connected battery pack 16. The battery pack 16 which is not being charged will discharge to the external load 20. According to the embodiment of the present invention, the booster 222 of the boost charging device 22 which performs charging will receive the electrical power from the hydrogen fuel cell 124 for boosting and then transmit the boosted electrical power to the charger 224. The charger 224 is able to convert the boosted electrical power into charging power and to transmit it to the battery pack 16 for charging. At this time, the battery pack 16 which discharges the external load 20 will not be charged from its correspondingly connected boost charging device 22, which means when one boost charging device 22 is charging its correspondingly connected battery pack 16, the other boost charging device 22 will not charge its correspondingly connected battery pack 16 which is in discharging.

Furthermore, the control module 18 is utilized for controlling the boost charging devices 22, in which the first detection circuit 228 detects the value of the boosted electrical power which is transmitted to the charger 224 from the charging switch controller 226. Meanwhile, the first detection circuit 228 detects the value of the charging power converted from the charger 224 such that the control module 18 determines whether or not the charging switch controller 226 should be turned on or off so as to selectively transmit the boosted electrical power from the booster 222 to the charger 224 for further converting process. Besides, the second detection circuit 28 detects the value of the discharging power which the battery pack 16 discharges the external load 20 as well as the remaining power of the discharging battery pack 16. As a result, the control module 18 is able to make the at least two battery packs 16 alternate performing charging or discharging process repeatedly by turns.

Figure 5:
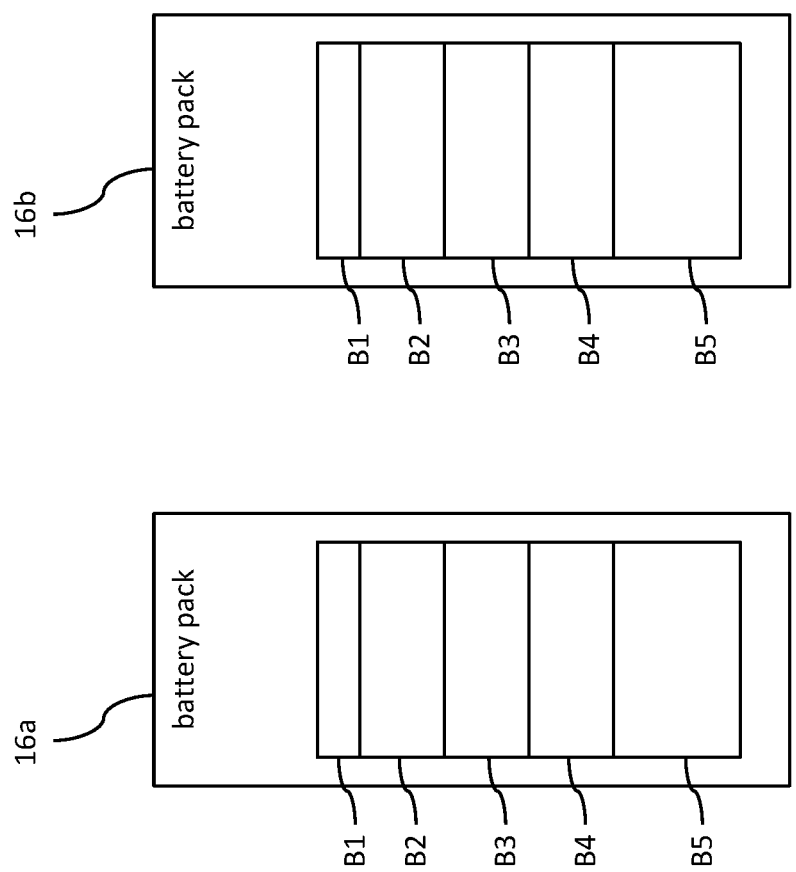
FIG. 5 shows an illustration of the storage power in accordance with one embodiment of the hydrogen fuel cell module of the present invention.

For example, please refer to FIG. 5 in which the storage power of the battery packs 16a, 16b can be individually divided into five blocks, comprising the first block B1 indicating 10% power of the battery packs 16a, 16b; the second block B2 indicating 20% power of the battery packs 16a, 16b; the third block B3 indicating 20% power of the battery packs 16a, 16b; the fourth block B4 indicating 20% power of the battery packs 16a, 16b; and the fifth block B5 indicating 30% power of the battery packs 16a, 16b. According to one embodiment of the present invention, the second detection circuit 28 is able to detect the remaining power of the battery pack 16a. Assume that the discharging battery pack 16a runs out of its power amount of the first block B1, the control module 18 stops the battery pack 16a from keeping discharging. Instead, it controls the charging switch controller 226 such that the charger 224 continues converting the electrical power into charging power for outputting to charge the battery pack 16a. The control module 18 is able to turn the discharging switch controller 24 off so as to stop the battery pack 16a from continuing discharging. In general, as soon as the battery pack 16a stops discharging, another battery pack 16b starts discharging. The control module 18 is able to turn the discharging switch controller 24 on so as to make the battery pack 16b start discharging. The battery pack 16b will not be charged until it runs out of its power amount of the first block B1 or the battery pack 16a is fully charged. By such arrangements, one of the two battery packs 16a, 16b can be charging while the other is discharging, and thus these two battery packs 16a, 16b can alternate performing charging and discharging process repeatedly by turns. In one embodiment, how the control module 18 controls where or not the discharging switch controller 24 is turned on or off is by utilizing a driving switch controller 26 which is characterized by a smaller turn-on voltage and turn-on current to drive an on or off state of the discharging switch controller 24 having a larger turn-on voltage and turn-on current. Nevertheless, the present invention is not limited thereto.

Figure 6:
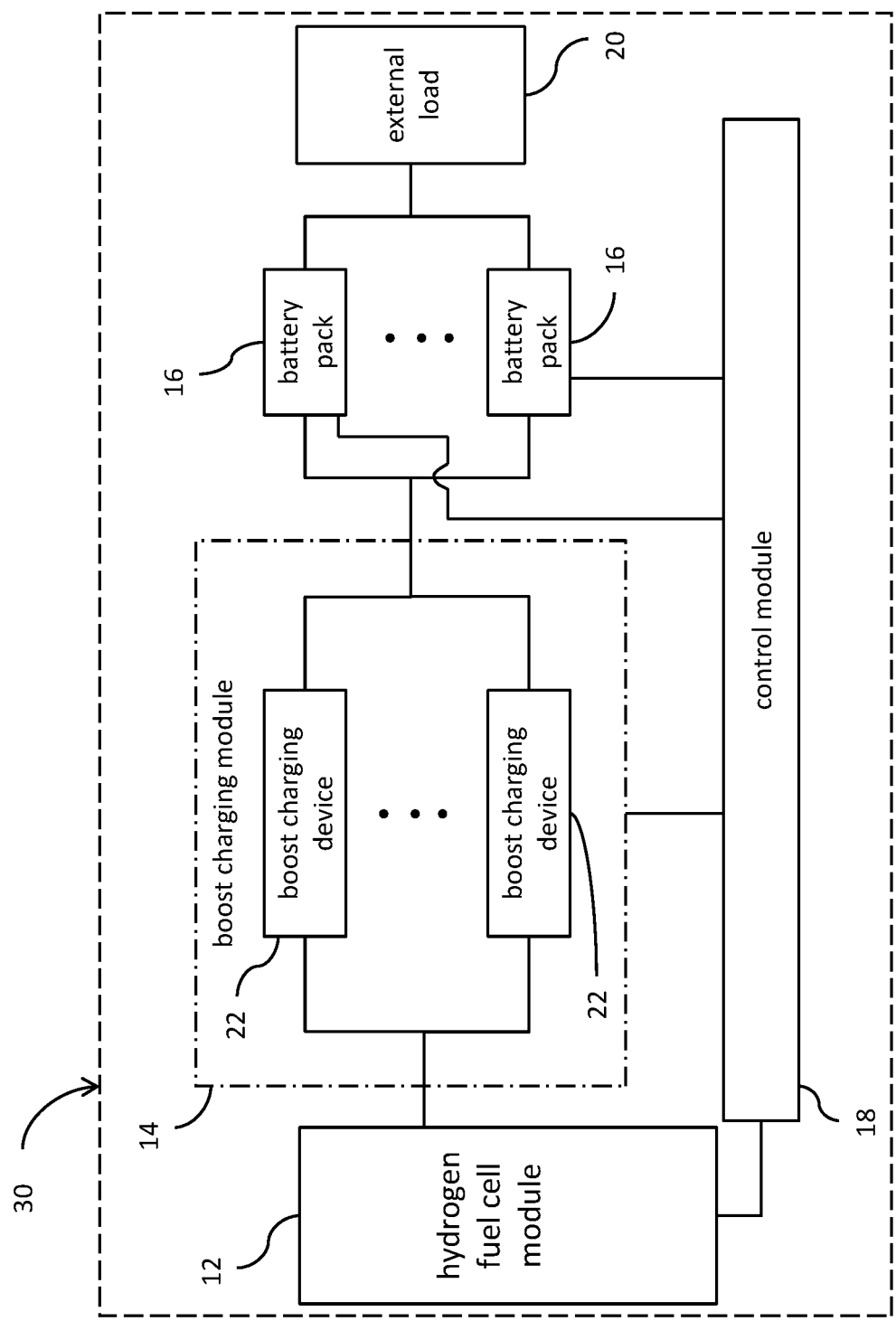
FIG. 6 shows a block diagram in accordance with one embodiment comprising a plurality of battery packs of the present invention.

The above mentioned situation is provided under the condition that the power supplying demands of the two battery packs are greater than the power discharging demands, for example, the two battery packs take turns to perform charging and discharging process. However, if the storage power of the battery pack is downed to the forth block or even the fifth block due to an even larger discharging demand, a low power mode of the control module can be adjusted by users so as to save the power consumption and to maintain merely the power supply for the system before the battery packs are fully charged again. Meanwhile, users can check if the power supply system and/or the external load are faulty, or the power consumptions of the external load are too large such that the discharging demand is too high for the two battery packs to catch up with. In other words, when one of the battery packs discharges too fast while the other battery pack cannot wait to charge, users may consider disposing more battery packs for alternating performing charging and discharging repeatedly by turns in order to generate more power supplied. The embodiment as discussed earlier is shown only with two battery packs. However, users may use three, fourth, or even more battery packs in parallel as shown in FIG. 6 for generating more power supplied. In FIG. 6, it is apparent that a power supply system 30 with hydrogen fuel cell is provided, which comprises a plurality of battery packs 16. As such, each of the plurality of battery packs 16 can alternate performing discharging when the external load 20 needs extremely high electrical power before it runs out of its storage power. And when the external load 20 becomes requiring less, each of the plurality of battery packs 16 will be able to have enough time to recover back to its original storage power.

Moreover, considering when the battery packs are not discharging, they may start to charge one another due to their relative voltage drop in between. To avoid the situation, a Zener diode (not shown) can be further disposed between the boost charging device of the boost charging module and the battery pack. Also, for estimating the amount of the storage power, since the battery packs are usually in discharging practically, resulting in a voltage drop, the voltage drop will be approximately equal to its discharging current times parameter α as shown in the equation (1).

$$\alpha = (V_{O\_C} - V_O)/I_O \tag{1}$$

α is a ranging parameter; $V_{O\_C}$ is an open circuit voltage; $V_O$ is a discharging voltage; and $I_O$ is a discharging current. By such equation, the voltage drop of the battery packs in parallel as well as that of the original power supplying battery packs can be eliminated and balanced, such that no crossed charging between the battery packs will be generated. Therefore, by measuring the discharging voltage and estimating the open circuit voltage, an actual storage power of the battery packs can be obtained based on the open circuit voltage. For instance, Table 1 shows the data in which 10.5V-12.6V indicating 0-100% power of the battery packs. The voltages and currents of the battery packs are measured when they supply power first. Then the circuit is cut-out to measure its open circuit voltage. As such, a correlation of voltages of the battery packs in discharging as well as the open circuit voltage can be estimated. By employing the equation (1), then α can be calculated. Since α is a ranging parameter depending on different discharging current and open circuit voltage, an average value is usually adopted as the calculated α so as to calculate its linear curve. Then, the open circuit voltage $V_{O\_C}$ can be computed accordingly. Assume the average α=0.087 to perform an electrical power control to the battery pack with respect to the open circuit voltage. Since the higher the open circuit voltage is, the more storage power of the battery pack is, the open circuit voltage can be computed through the equation (2) based on the equation (1), and the storage power of the battery pack can be calculated as well due to the computed $V_{O\_C}$.

$$V_{O\_C} = \alpha I_O + V_O \tag{2}$$

According to the embodiment of the present invention, the calculations and equations disclosed above can all be preset in the control module, and by employing the control module to detect those voltage and/or current changes, a charging and discharging behavior of the battery packs can be obtained and preset.

TABLE 1

| Discharging voltage ($V_O$) | Discharging current ($I_O$) | Open circuit voltage ($V_{O\_C}$) | α |
|---|---|---|---|
| 10.99 | 6.88 | 11.59 | 0.0872 |
| 11.16 | 4.63 | 11.57 | 0.0885 |
| 11.12 | 5.25 | 11.58 | 0.0876 |
| 10.92 | 7.88 | 11.61 | 0.0875 |

As a result, to sum up, the present invention provides a novel and inventive power supply system comprising logic control circuits involved with hydrogen fuel cell and lithium polymer battery, which utilizes hydrogen as its source of the system to generate electricity, and employs its distinct circuit structures and switching logics so as to output stable power supply. Also, by adopting the switching logics, detecting the current which is converted from the hydrogen fuel cell and the current consumption of its external load, the storage power of the battery packs used in the power supplying system can be estimated. As such, each battery pack which should be in discharging or in charging process can be properly dispatched, and the relative voltage drop there in between can be balanced so as to prevent the power consumption due to their crossed charging behavior between the battery packs in parallel. In addition, the present invention is applied to a mobile robot and consumes the power of the robot in order to prove the stability of power supplying currents. Also, for preventing a hydrogen concentration of the hydrogen fuel cell from decreasing as time goes by, a simply expelling logic can be further disposed in designing the hydrogen fuel cell so as to maintain its hydrogen concentration. Also, its stability while outputting the power is proved by experimental results of the present invention.

The embodiments described above are illustrated to demonstrate the objectives, technical contents and advantages of the present invention. However, it shall be noticed that, the above mentioned only shows exemplary embodiments of the present invention, and is not intended to limit the scope of the present invention. It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A power supply system with hydrogen fuel cell, comprising:
   a hydrogen fuel cell module, for converting hydrogen fuel into electrical power for outputting;
   a boost charging module, electrically connected to the hydrogen fuel cell module for receiving the electrical power output from the hydrogen fuel cell module, and boosting the electrical power to convert into charging power for outputting;
   at least two battery packs connected in parallel, wherein each of the battery packs is electrically connected to the boost charging module and an external load, and when one of the battery packs is discharging to the external load, the other of the battery packs is selectively receiving the charging power from the boost charging module;
   a control module, electrically connected to the hydrogen fuel cell module, the boost charging module and the at least two battery packs, wherein the control module controls the boost charging module to receive the electrical power output from the hydrogen fuel cell module and to boost and convert it into the charging power, and the control module controls the at least two battery packs to alternate performing discharging the external load and charging from the boost charging module repeatedly by turns;
   at least two discharging switch controllers, wherein each of the discharging switch controllers is electrically connected to one of the battery packs, the external load, and the control module, and the control module is able to turn each of the discharging switch controllers on or off so as to control the battery packs to discharge the external load selectively; and
   at least two driving switch controllers, being electrically connected to the at least two discharging switch controllers and the control module, wherein turn-on voltages and turn-on currents of the at least two driving switch controllers are smaller than those of the at least two discharging switch controllers, and the at least two driving switch controllers are controlled by the control module so as to drive an on or off state of the at least two discharging switch controllers.

2. The power supply system with hydrogen fuel cell according to claim 1, wherein the boost charging module further comprises at least two boost charging devices, and each of the boost charging devices is electrically connected to the hydrogen fuel cell module and one of the battery packs.

3. The power supply system with hydrogen fuel cell according to claim 2, wherein the boost charging module further comprises:
   a booster, being electrically connected to the hydrogen fuel cell module and receiving the electrical power for boosting; and
   a charger, being electrically connected to the booster and the battery packs to receive and convert the boosted electrical power into the charging power for transmitting to the battery packs.

4. The power supply system with hydrogen fuel cell according to claim 3, wherein the boost charging module further comprises a charging switch controller being electrically connected to the booster, the charger and the control module, and the control module determines whether or not the charging switch controller should be turned on or off so as to selectively transmit the boosted electrical power from the booster to the charger for further converting process.

5. The power supply system with hydrogen fuel cell according to claim 4, wherein the boost charging module further comprises a first detection circuit, being electrically connected to the charging switch controller, the control module and the charger, the first detection circuit is able to detect a value of the boosted electrical power which is transmitted to the charger from the charging switch controller and to detect a value of the charging power converted from the charger such that the control module determines whether or not the charging switch controller should be turned on or off based on the first detection circuit.

6. The power supply system with hydrogen fuel cell according to claim 5, wherein the first detection circuit is a Hall current sensor.

7. The power supply system with hydrogen fuel cell according to claim 4, wherein the charging switch controller is a relay.

8. The power supply system with hydrogen fuel cell according to claim 1, wherein each of the discharging switch controllers and the driving switch controllers is a relay.

9. The power supply system with hydrogen fuel cell according to claim 1, wherein the hydrogen fuel cell module further comprises:
a hydrogen storing circuit, for storing the hydrogen fuel;
a hydrogen fuel cell, being electrically connected to the hydrogen storing circuit for receiving the hydrogen fuel from the hydrogen storing circuit and converting the hydrogen fuel into the electrical power for outputting;
a detecting element, being disposed between the hydrogen storing circuit and the hydrogen fuel cell and electrically connected to the control module, wherein the detecting element detects a concentration of the hydrogen fuel in the hydrogen fuel cell and transmits the detected concentration to the control module; and
an expelling element, being disposed inside the hydrogen fuel cell and electrically connected to the control module, wherein when the concentration of the hydrogen fuel cell decreases, the control module controls the expelling element to remove impurities inside the hydrogen fuel cell so as to increase the concentration of the hydrogen fuel in the hydrogen fuel cell.

10. The power supply system with hydrogen fuel cell according to claim 9, wherein the expelling element is an electromagnetic valve.

11. The power supply system with hydrogen fuel cell according to claim 1, further comprising a second detection circuit disposed between the at least two battery packs and the external load and being electrically connected to the at least two battery packs, the external load and the control module, wherein the control module controls the at least two battery packs to alternate performing charging or discharging process repeatedly by turns by employing the second detection circuit to detect a value of discharging power which any one of the battery packs discharges the external load.

12. The power supply system with hydrogen fuel cell according to claim 11, wherein the second detection circuit is a Hall current sensor.

13. The power supply system with hydrogen fuel cell according to claim 1, wherein the external load is a mobile robot or an electrical vehicle.

14. The power supply system with hydrogen fuel cell according to claim 1, wherein each of the battery packs is a lithium polymer battery (Li—Po).

* * * * *